Figure 1:
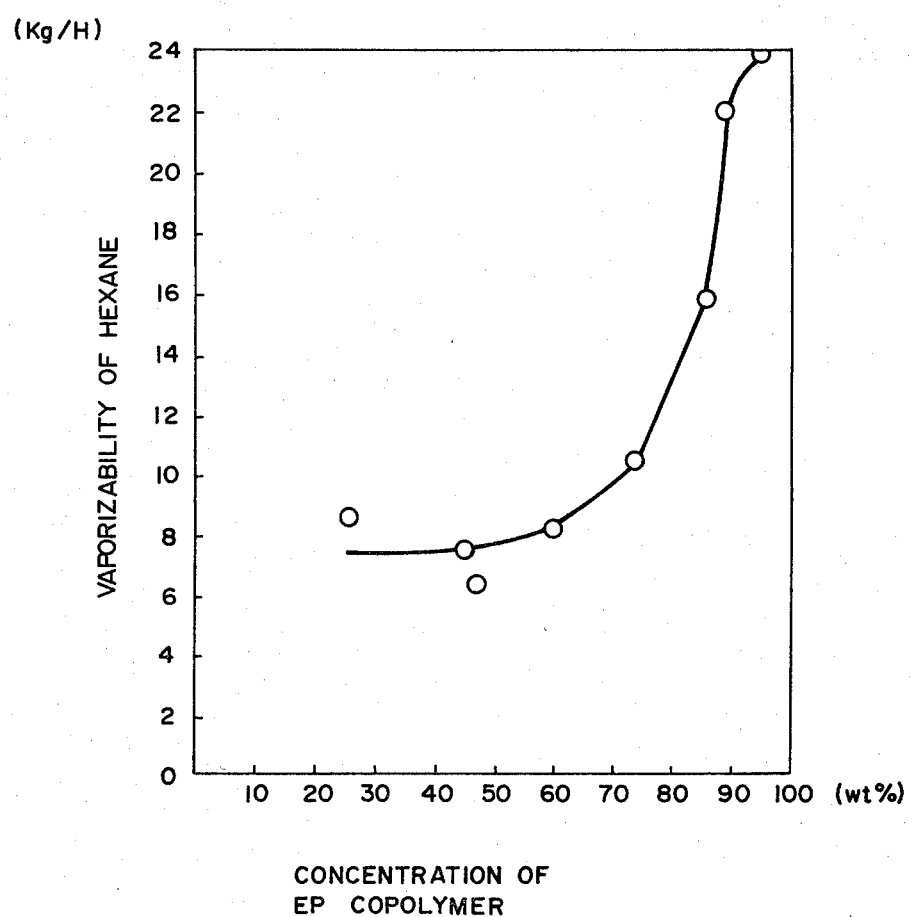

United States Patent [19]

Takao et al.

[11] 4,407,989

[45] Oct. 4, 1983

[54] PROCESS FOR THE SEPARATION TREATMENT OF POLYMER FROM POLYMER SOLUTION

[75] Inventors: Hiroyoshi Takao, Chiba; Yoshio Inoue, Ichihara, both of Japan

[73] Assignee: Sumitomo Chemical Company, Limited, Osaka, Japan

[21] Appl. No.: 348,772

[22] Filed: Feb. 16, 1982

[30] Foreign Application Priority Data

Feb. 23, 1981 [JP] Japan .................................. 56-25753
May 25, 1981 [JP] Japan .................................. 56-79872

[51] Int. Cl.$^3$ .............................................. C08J 9/28
[52] U.S. Cl. .................................... 523/340; 528/501
[58] Field of Search ................ 523/340, 342; 528/501

[56] References Cited

U.S. PATENT DOCUMENTS

| | | | |
|---|---|---|---|
| 3,553,156 | 1/1971 | Anolick et al. ..................... | 523/340 |
| 3,586,089 | 6/1971 | Mato et al. | |
| 4,129,629 | 12/1978 | Gordon ............................... | 523/340 |
| 4,198,265 | 4/1980 | Johnson . | |

FOREIGN PATENT DOCUMENTS

971420 9/1964 Belgium .............................. 528/501

*Primary Examiner*—Joseph L. Schofer
*Assistant Examiner*—N. Sarofim
*Attorney, Agent, or Firm*—Stevens, Davis, Miller & Mosher

[57] ABSTRACT

A process for the separation treatment of a polymer solution characterized by, in separating and recovering polymer and polymerization solvent by flashing a polymer solution, heating said polymer solution under an elevated pressure sufficient to maintain said solution in a liquid phase, sending said solution into a flashing tank kept at an inner surface temperature of 140° C. or above and a pressure ranging from ordinary pressure to 5 kg/cm$^2$ G, flashing said solution to evaporate and separate the solvent, thereby concentrating said solution so that concentration of the polymer in said solution becomes 80% by weight or more, and recovering the concentrated solution from the bottom part of the flashing tank.

10 Claims, 2 Drawing Figures

F I G. I

PROCESS FOR THE SEPARATION TREATMENT OF POLYMER FROM POLYMER SOLUTION

The present invention relates to a process for separating polymer from a polymer solution.

More particularly, the present invention relates to a process for recovering a polymer which is an ethylene-α-olefin binary copolymer, an ethylene-α-olefin-nonconjugated polyene ternary copolymer or other polymer produced by a polymerization process known as solution polymerization process from its polymerization solution, namely a process for separating and recovering said polymer by removing a solvent (it can include the residual monomer; hereinafter the same) such as conventionally used hydrocarbon solvents.

In general, in the production process of polymers by solution polymerization, a removing apparatus for removing the solvent from the polymer solution formed in the polymerization reactor is incorporated and various methods have been employed hitherto.

In the general thermoplastic substances, there has hitherto been known a process which comprises heating the polymer mixture by means of various indirect type heat exchangers and flash-evaporating the solvent in a vessel by utilizing the sensible heat of polymer mixture. However, this method has as a fault the fact that the polymer is usually highly viscous in the liquid state and highly adhesive or sticky in the powdery or granular state so that the polymer adheres to the wall of the flashing tank or the like and is difficult to discharge from the tank and therefore a mechanical discharging device is necessary for maintaining a stable operation or the flashing tank is usable only for the purpose of preliminary condensation and the concentration of polymer is limited to a relatively low value (for example, 50% by weight). The present invention overcomes the above-mentioned fault.

It is an object of the present invention to provide a process for separating and recovering polymer and solvent from a polymer solution with a high efficiency.

Other objects and advantages of the present invention will become apparent from the descriptions given below.

The process of the present invention for the separation treatment of polymer from a solution of ethylene-α-olefin binary copolymer, ethylene-α-olefin-nonconjugated polyene ternary copolymer or other polymer produced by a polymerization process known as the so-called solution polymerization process is firstly characterized by heating the solution under an elevated pressure enough to maintain said solution in a liquid phase, sending said solution to a flashing tank kept at an inner surface temperature of 140° C. or above and a pressure ranging from ordinary pressure to 5 kg/cm$^2$G, flashing said solution to evaporate and separate the solvent, thereby concentrating said solution so that the concentration of the polymer in said solution becomes 80% by weight or more, and recovering the concentrated solution from the bottom part of the flashing tank. The process of the present invention is secondly characterized in that, in flashing a polymer solution to separate and recover polymer from the polymer solution, the inner surface temperature of flashed product duct, which is a duct for supplying polymer and solvent vapor after flashing into the flashing tank, is maintained at 140° C. or above by, for example, providing a heating jacket outside the flashed product duct, the flashed product duct is inserted into the flashing tank through its side wall and bent toward the bottom of flashing tank with a radius of curvature so that a sufficient special capacity can be secured in the upper part of the flashing tank, and length of said flashed product duct is made shorter than the length of flashed product duct inserted through upper part of flashing tank, owing to which polymer and solvent vapor can be supplied into the flashing tank smoothly and stably without adhesion nor fixation of polymer on the inner wall of the flashed product duct and the solvent vapor and polymer can be smoothly and stably separated and recovered in the flashing tank.

According to the present invention, a polymer solution which has been concentrated to a concentration of 80% by weight or more can be obtained effectively and easily from a polymer solution having a low concentration.

The process of the present invention can be employed for separating and recovering polymer from a solution of polymer produced by solution polymerization process such as solutions of ethylene-α-olefin binary copolymer and ethylene-α-olefin-nonconjugated polyene terpolymer (hereinafter, they are generically referred to as EP copolymer), polybutadiene rubber, styrene-butadiene copolymer rubbers (SBR and modified SBR) and the like.

In the drawings attached, FIG. 1 illustrates the relation between concentration of EP copolymer and vaporizability of hexane in the referential example.

Figure 2:
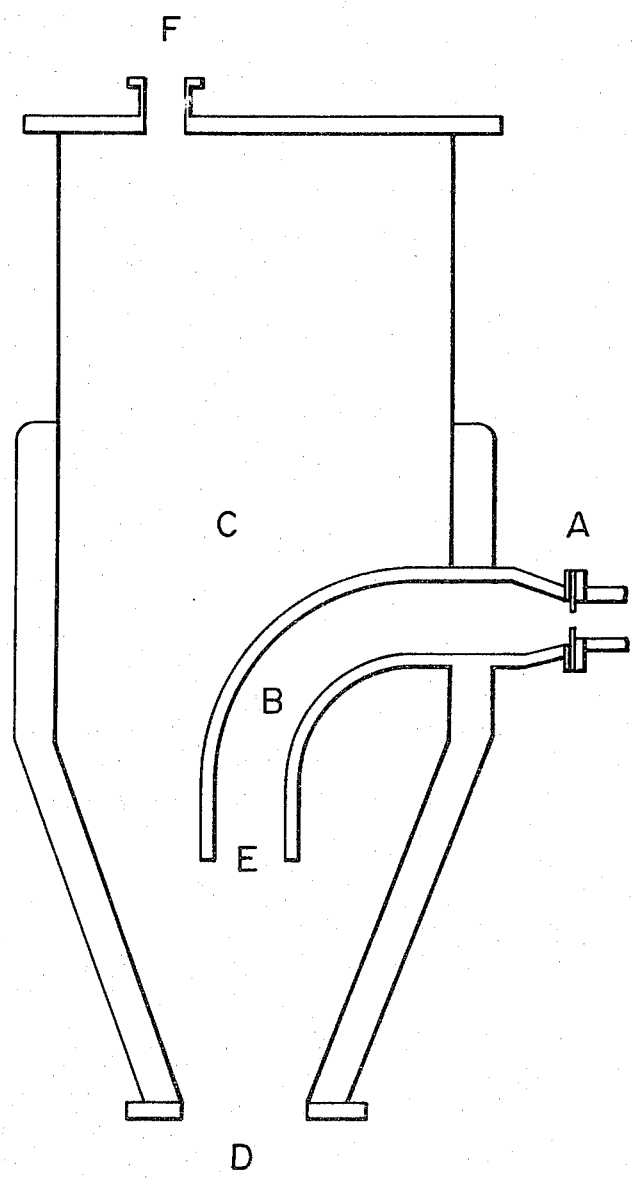

FIG. 2 presents transverse sectional views of the flashed product duct and flashing tank used in this invention, wherein A is flashing hole, B is flashed product duct, C is flashing tank, D is polymer outlet, E is downstream end of flashed product duct and F is vapor outlet.

The present invention will be explained in detail below by referring to one example of the case of EP copolymer.

According to prior technique, an EP copolymer can be obtained by polymerizing ethylene, α-olefin and optionally nonconjugated diene with a Ziegler catalyst in a hydrocarbon solvent having 5–10 carbon atoms and particularly a solvent such as hexane, heptane or the like. Optionally, the polymer solution leaving the polymerization reactor (in the case of EP copolymers, the concentration is usually 3–15% by weight) is filtered or washed with water, acid or alkali and then heated. The heating is carried out by means of a heater under an elevated pressure sufficient to maintain the polymerization solvent in a liquid state, namely under a pressure which is higher than the equilibrium pressure between solvent and vapor at that temperature at any place in the heater.

When the above-mentioned pressure is not maintained, the solvent vaporizes in the heater and the polymer content rises in some localities in the pipings of the heater, heat-exchanger and the like so that the pipings can be clogged, which is undesirable.

At this time, the quantity of heat given to the solution can easily be determined with consideration of polymer concentration of the solution and polymer concentration of the recovered solution. Preferably, however, it is a quantity sufficient to vaporize substantially the whole quantity of the solvent when the solution is flashed.

The solution which has been heated under elevated pressure in the heater is then flashed and introduced into flashing tank through flashed product duct which is connected without valve to the flashing tank which is controlled at atmospheric pressure or elevated pressure, where it is separated into polymer and polymer solvent vapor.

The first characteristic feature of the present invention will be mentioned in detail below. The discharging of the concentrated polymer solution from the flashing tank can be made easy by keeping the pressure of the flashing tank in the range of 0–5 kg/cm² G and preferably 1–2 kg/cm² G. Since elevation of the pressure of the flashing tank brings about an increase in the heat quantity necessary for obtaining the aimed concentration of the polymer solution recovered, it is particularly economical and desirable to restrict the elevation of pressure to 1–2 kg/cm² G by, for example, enlarging the diameter of the concentrated polymer solution outlet hole of the flashing tank.

By providing a heating jacket or some other means on the outsides of the flashed product duct and the flashing tank, the temperatures of the inner wall surface (hereinafter, referred to as skin) of the flashed product duct and the flashing tank are maintained preferably above 140° C. and more preferably above 180° C. By this procedure, a solution having a polymer content of 80% by weight or more can easily be discharged from the flashing tank through the flashed product duct with an enhanced fluidity of the polymer and without adhesion to the walls of the flashed product duct and the flashing tank while keeping the quality of polymer solution. If the skin temperatures of the flashed product duct and the flashing tank are lower than 140° C., the highly concentrated polymer solution has a high adhesiveness and stickiness, which is undesirable.

On the other hand, if the skin temperatures exceed the above-mentioned preferable range, for example at a skin temperature of 250° C., the quality of polymer can be injured by degradation or gelation in the case of EP copolymer. It is preferable, therefore, that the skin temperatures of the flashed product duct and the flashing tank do not exceed 240° C.

The zones of the flashed product duct and the flashing tank at which skin temperature should be kept at 140° C. or above, and preferably 180° C. or above, are the zones coming into contact with the concentrated solution. That is, as for the flashed product duct, the zone includes its inner skin, as well as the outer skin portion of the duct which is present in the flashing tank. The temperature of the inner wall of the upper space of flashing tank may be a temperature only a little higher than the boiling point of the solvent at the inner pressure of flashing tank, namely, a temperature at which the flashed solvent vapor does not condense.

The first characteristic feature of the present invention can be exhibited effectively when the present invention is applied to polymer solutions produced by a polymerization process known as solution polymerization process, and its effect is particularly pronounced in the case of EP polymer solution. In the case of EP polymer solution, the concentration of EP copolymer should be 80% by weight or more and preferably 90% by weight or more. By making it 80% by weight or more, the adhesiveness and stickiness of the concentrated solution can be reduced conspicuously and therefore the wall surface can be kept clean, which is attributable to the possibility of maintaining a high speed removal of solvent from tank wall.

As is apparent from the referential example mentioned later, this effect is markedly exhibited when the concentration is 80% by weight or more and particularly 90% by weight or more.

This effect is characteristic of EP copolymers. Thus, in the case of a solution of rubbers other than EP copolymer such as polyisoprene solution, particles having a diameter of 10–20 mm adhere to wall even if they are mechanically scraped so that the first characteristic feature of this invention cannot be exhibited so markedly as in the case of EP copolymers.

In FIG. 2, a solution heated in the heater under elevated pressure is flashed at flashing hole (A) to deposit a polymer. Together with solvent vapor, the polymer moves in flashed product duct (B) and is fed into flashing tank (C), where concentrated polymer solution is discharged from polymer outlet (D) and solvent vapor is separated and discharged from vapor outlet (F). Skin temperatures of flashed product duct (B) and flashing tank (C) are maintained by, for example, providing a heating jacket on their outsides.

The flashed product duct (B) is so shaped that it is, for example, horizontally inserted from the side wall of the flashing tank (C) into the interior of the flashing tank (C) and turns in a vertical direction so that its downstream end is approximately overhead the polymer outlet (D) of the flashing tank, whereby the polymer and the solvent vapor can flow through the duct (B) and down towards the polymer outlet (D) of the flashing tank.

The turning point from the direction of insertion from the side wall to the vertical direction is made to have a radius of curvature ranging from ⅛ to 6/8 and preferably ⅜ to 4/8, as expressed by the ratio to the inner diameter of the flashing tank at the height of the turning point of the flashed duct (B).

Further, preferably, the length of the straight portion of the pipe after turning to the vertical direction is made 1–3 times and preferably 2 times as long as the inner diameter of flashed product duct (B). The inner diameter of the flashed product duct (B) is designed so that the velocity of the solvent vapor becomes 0.5–6 m/sec and preferably falls in the range of not smaller than 0.5 m/sec and smaller than 1 m/sec. By using a flashed product duct having the above-mentioned shape, the polymer and the solvent vapor after being flashed move in the flashed product duct (B) as a mixed phase flow without adhesion nor fixation on the inner wall of flashed product duct (B) and then flow down towards the polymer outlet (D) of the flashing tank.

If the radius of curvature of the flashed product duct (B) at the turning point from the horizontal direction to the vertically downward direction is less than the above-mentioned value, a stagnation can take place in the flow at the turning portion of the duct (B). On the other hand, if it is greater than the above-mentioned value, the volume of the flashing tank becomes unnecessarily great, which is not economical in terms of the production and construction of apparatus as well as its cost of operation.

If the inner diameter of the flashed product duct (B) is less than a value sufficient to give the aforementioned solvent vapor velocity, the apparatus becomes too great and the amount of material treated per unit time becomes small, which is undesirable. On the other hand, if the inner diameter of the flashed product duct (B) is greater than a value sufficient to give the aforementioned solvent vapor velocity, the solvent vapor flow dashes against the surface of the concentrated polymer solution residing in the lower part of the flashing tank (C) to splash the polymer again. Thus, a space for reducing the speed of impact must be provided between the lower end (E) of the flashed product duct and the liquid surface of the concentrated polymer solution residing in the flashing tank (C), which is undesirable.

According to the present invention, the distance between the lower end (E) of the flashed product duct and the liquid surface of the concentrated polymer solution residing in the flashing tank (C) can be restricted to a value sufficient to prevent the flashed product duct (B) from sinking into the concentrated polymer solution by taking into account a certain definite width of variation in the height of the liquid surface which is dependent on the stabilities and variation-responses of the steps before and after the flashing tank (C) and flashed product duct (B).

In the present invention, it is allowable to provide a scraping device for accelerating the flow-down of concentrated polymer solution to the bottom of the tank along the inner wall of the flashing tank, though it is not always necessary.

Although it is not particularly necessary in the present invention to provide a mechanically forced discharging device at the outlet for the concentrated polymer solution of the flashing tank, a combination with an apparatus for breaking or preventing the bridge formation of polymer may sometimes be effective, depending on the size and shape of the discharging hole for the concentrated solution.

Optionally, the concentrated polymer solution discharged from the flashing tank may be sent to a vent type extruder or a kneading type drier in order to additionally remove the residual solvent.

In such a case, for controlling the feed to the next step such as a vent type extruder, one or more methods selected from the method of controlling the amount of receipt in the side of vent type extruder, the method of controlling the amount of hot solution under pressure to be flashed and a method of controlling it by providing a rating roller at the polymer solution outlet of flashing tank can be employed.

The present invention will be explained more concretely with reference to the following Referential Example and Examples which are presented for purposes of illustration only and should in no way be considered limitative.

REFERENTIAL EXAMPLE

Into a tank of the following specification, equipped with a heating jacket, was introduced 12.8 liters of the EP copolymer solution mentioned below. While keeping the pressure at 400±100 mm Hg (G), carrying out agitation at a speed of 20 r.p.m. and heating it under a condition that skin temperature became 195° C.±5° C., hexane was continuously vaporized out of the tank on the one hand and an amount, equal to the amount of vaporization, of hexane was continuously fed into the tank and mixed into the EP copolymer solution on the other hand, in order to keep the concentration of the EP copolymer solution constant. This experiment was carried out at various concentrations of the solution. The relation between the concentration of solution and the amount of vaporized hexane is shown in FIG. 1.

When the concentration of EP copolymer solution was 80% by weight or more and particularly 90% by weight or more, the sticking force and adhesion force rapidly decreased and, as its result, vaporizability of solvent rapidly increased as is apparent from FIG. 1.

Specification of tank equipped with jacket
  Total capacity: 14 liters
  Heat transfer area of jacket: 0.36 m$^2$
  Stirrer: paddle type wing (3 wings; clearance 1–1.5 mm)
  Material quality: SUS-316 (inner wall of tank/paddle)
EP copolymer solution
  EP copolymer: ternary copolymer consisting of 64% by weight of ethylene component, 32% by weight of propylene component and 4% by weight of dicyclopentadiene component
Solvent: Hexane

EXAMPLE 1

Separation was carried out under the following conditions, using a 7% by weight hexane solution of the same EP copolymer as used in Referential Example and using a flashing tank (material quality SUS-304), equipped with a heating jacket, composed of an upper cylindrical part and a lower conical part of which cylindrical part had an inner diameter of 445 mm and a height of 650 mm and conical part had a height of 400 mm and a bottom diameter of 130 mm. As a result, the adhesion of the concentrated EP copolymer to the inner wall of the tank was slight, and its stability and smoothness in flow-down from the lower part of the tank was also good.

| Conditions | |
|---|---|
| Amount of EP copolymer solution fed: | 240 liters/hour |
| Temperature and pressure of solution before flashing: | 218° C.; 28 kg/cm$^2$G |
| Temperature of inner wall of flashing tank (skin temperature): | 200° C. |
| Temperature and pressure in flashing tank: | 130° C.; 1.0 kg/cm$^2$G |
| Concentration and temperature of concentrated EP copolymer solution at outlet of flashing tank: | 95% by weight; 165° C. |

EXAMPLES 2–6 AND COMPARATIVE EXAMPLES 1–3

Separation of solvent was carried out under the conditions shown in Table 1 with the same flashing tank, EP copolymer solution and feed of solution as in Example 1. The results are shown in Table 1.

TABLE 1

| | Comparative Example 1 | Comparative Example 2 | Comparative Example 3 | Example 2 | Example 3 | Example 4 | Example 5 | Example 6 |
|---|---|---|---|---|---|---|---|---|
| EP copolymer content of EP copolymer solution at outlet of flashing tank | 46 | 92 | 91 | 93 | 92 | 95 | 95 | 93 |

TABLE 1-continued

| | Comparative Example 1 | Comparative Example 2 | Comparative Example 3 | Example 2 | Example 3 | Example 4 | Example 5 | Example 6 |
|---|---|---|---|---|---|---|---|---|
| (% by wt.) | | | | | | | | |
| Skin temperature of flashing tank (°C.) | 70 | 80 | 130 | 140 | 150 | 180 | 180 | 240 |
| Inner pressure of flashing tank (kg/cm$^2$G) | 0 | 0 | 1.2 | 1.2 | 1.2 | 0 | 1.2 | 1.2 |
| Extent of adhesion of EP copolymer to the skin of flashing tank | Great | Great | Great | Small | Small | Very small | Very small | Very small |
| Stability and smoothness in flow-down of EP copolymer from flashing tank | Good | Bad | Bad | Good | Good | Good | Very good | Very good |

EXAMPLE 7

Using a flashing tank and a flashed product duct of the following specifications, both equipped with heating jacket, an experiment was carried out on a solution of EP copolymer. The conditions and the results of the experiment were as follows.

Flashing tank equipped with jacket:
(1) It is composed of an upper cylindrical part and a lower conical part and equipped with a heating jacket on its whole outer surface except for the over lid of the cylindrical part.
(2) The upper cylindricald part has an inner diameter of 455 mm and a height of 650 mm.
(3) The lower conical part has a bottom diameter of 130 mm and a height of 400 mm.
(4) It is provided with a solvent vapor discharging pipe at the center of cylindrical part.

Flashed product duct equipped with jacket:
(1) A horizontal pipe piercing the side wall of the cylindrical part at a point 135 mm above the borderline of conical part and cylindrical part is bent downwards vertically with a radius of curvature shown in Table 2.
(2) The flashed product duct has a heating jacket.
(3) The distance between the tip of the flashed product duct and bottom of the flashing tank is 300 mm.

Sample tested:
A solution, in hexane, of ternary copolymer comprising 64% by weight of ethylene component, 32% by weight of propylene component and 4% by weight of dicyclopentadiene component.

| Conditions and results of experiment: | |
|---|---|
| Amount of polymer solution fed: | 240 liters/hour |
| Temperature and pressure of solution before flashing: | 218° C.; 28 kg/cm$^2$G |
| Temperature and pressure in flashing tank: | 130° C.; 1.0 kg/cm$^2$G |
| Temperature of inner wall surface of flashing tank: | 200° C. |
| Temperature of inner wall surface of flashed product duct: | shown in Table 2 |
| Vapor speed at the tip of flashed product duct: | shown in Table 2 |
| Concentration of solvent in the polymer solution fed: | 93% by weight |
| Concentration of solvent in the polymer solution recovered from flashing tank: | 5% by weight |
| Results of experiment: | Table 2 |

Table 2

| | Vapor speed at the tip of flashed product duct (m/sec) | Temperature of inner wall surface of flashed product duct (°C.) | Radius of curvature with which flashed product duct is bent in flashing tank | Result (Stability and smoothness in flow-down of polymer from flashed product duct) |
|---|---|---|---|---|
| Example 7-1 | 0.4 | 140 | (Inner diameter of the flashing tank) × ⅜ | Somewhat bad |
| Example 7-2 | 0.5 | 140 | (Inner diameter of the flashing tank) × ⅜ | Somewhat good |
| Example 7-3 | 0.5 | 180 | (Inner diameter of the flashing tank) × 6/8 | Good |
| Example 7-4 | 0.8 | 140 | (Inner diameter of the flashing tank) × ⅜ | Good |
| Example 7-5 | 0.8 | 180 | (Inner diameter of the flashing tank × ⅛ | Good |
| Example 7-6 | 2 | 180 | (Inner diameter of the flashing tank) × ⅜ | Good* |
| Example 7-7 | 6 | 180 | (Inner diameter of the flashing tank) × ⅜ | Good* |
| Example 7-8 | 10 | 180 | (Inner diameter of | Good** |

Table 2-continued

| Vapor speed at the tip of flashed product duct (m/sec) | Temperature of inner wall surface of flashed product duct (°C.) | Radius of curvature with which flashed product duct is bent in flashing tank | Result (Stability and smoothness in flow-down of polymer from flashed product duct) |
|---|---|---|---|
| | | the flashing tank) × ⅛ | |

Note (1)
The mark * in the result column of Table 2 means that a dash of solvent vapor against the surface of polymer solution residing in flashing tank is observed.
Note (2)
The mark ** in the result column of Table 2 means that there is an undesirable danger that solvent vapor may dash against the surface of polymer solution residing in flashing tank to splash the polymer solution.

EXAMPLE 8

An experiment was carried out on a solution of styrene-butadiene copolymer by using a flashing tank equipped with heating jacket and a flashed product duct of the following specifications. The conditions and the results of the experiment were as follows.

| | |
|---|---|
| Flashing tank equipped with jacket: | the same as in Example 7. |
| Flashed product duct: | the same as in Example 7-4. |
| Sample tested: | a solution, in hexane, of a binary copolymer comprising 25% by weight of styrene component and 75% by weight of butadiene component. |
| Conditions and results of experiment: | |
| Amount of polymer solution fed: | 240 liters/hour |
| Temperature and pressure of the solution before flashing: | 218° C.; 28 kg/cm²G |
| Temperature and pressure in flashing tank: | 130° C.; 1.0 kg/cm²G |
| Temperature of inner wall surface of flashing tank: | 200° C. |
| Temperature of inner wall surface of flashed product duct: | shown in Table 3 |
| Vapor speed at the tip of flashed product duct: | shown in Table 3 |
| Concentration of solvent in the polymer solution fed: | 93% by weight |
| Concentration of solvent in the polymer solution recovered from flashing tank: | 5% by weight |
| Results of experiment: | shown in Table 3 |

TABLE 3

| | Vapor speed at the tip of flashed product duct (m/sec) | Temperature of inner wall surface of flashed product duct (°C.) | Result (Stability and smoothness in the flow-down of polymer from flashed product duct) | Dash phenomenon of solvent vapor against the surface of polymer solution residing in flashing tank |
|---|---|---|---|---|
| Example 8-1 | 0.4 | 140 | Somewhat good | Not observed |
| Example 8-2 | 0.5 | 140 | somewhat good | Not observed |
| Example 8-3 | 0.5 | 180 | Good | Not observed |
| Example 8-4 | 0.8 | 140 | Good | Not observed |
| Example 8-5 | 0.8 | 180 | Good | Not observed |
| Example 8-6 | 2 | 180 | Good | Observed |
| Example 8-7 | 6 | 180 | Good | Observed |
| Example 8-8 | 10 | 180 | Good | Violent |

What is claimed is:

1. In a process for the separation treatment of a polymer solution, the improvement in separating and recovering polymer and polymerization solvent by flashing a polymer solution, which comprises heating said polymer solution under an elevated pressure sufficient to maintain said solution in a liquid state, sending said solution into a flashing tank kept at an inner surface temperature of 140° C. or above and a pressure ranging from ordinary pressure to 5 kg/cm² G, flashing said solution to evaporate and separate the solvent, thereby concentrating said solution so that concentration of the polymer in said solution becomes 80% by weight or more, and recovering the concentrated solution from the bottom part of the flashing tank.

2. A process according to claim 1, wherein the temperature of inner surface of the tank is 180° C. or above.

3. A process according to claim 1 or claim 2, wherein the concentration of polymer in the concentrated solution is 90% by weight or more.

4. A process according to claim 1, wherein the temperature of inner surface of flashed product duct, which is a duct for supplying the polymer and solvent vapor after flashing into the flashing tank, is maintained at 140° C. or above by providing a heating jacket on the outside of the flashed product duct or by some other means.

5. A process according to claim 4, wherein the temperature of inner surface of the flashed product duct is 180° C. or above.

6. A process according to claim 4, wherein said flashed product duct is so shaped that it is inserted into the flashing tank through the side wall of the flashing tank and bent towards the bottom of the flashing tank with a radius of curvature.

7. A process according to claim 6, wherein said radius of curvature with which flashed product duct is bent in the flashing tank is in the range of ⅛ to 6/8 based on the inner diameter of the flashing tank.

8. A process according to claim 4, wherein the velocity of solvent vapor at the tip of the flashed product duct is in the range of 0.5 m/sec to 6 m/sec.

9. A process according to claim 4, wherein the velocity of solvent vapor at the tip of the flashed product duct is not smaller than 0.5 m/sec and smaller than 1 m/sec.

10. A process according to any one of claims 1 to 3, wherein the polymer in said polymer solution is an ethylene-α-olefin binary copolymer or an ethylene-α-olefin-nonconjugated polyene ternary copolymer.

* * * * *